United States Patent
Trundle et al.

(10) Patent No.: US 10,836,309 B1
(45) Date of Patent: Nov. 17, 2020

(54) DISTRACTED DRIVER DETECTION AND ALERT SYSTEM

(71) Applicant: Alarm.com Incorporated, Tysons, VA (US)

(72) Inventors: Stephen Scott Trundle, Falls Church, VA (US); Allison Beach, Leesburg, VA (US); Donald Madden, Columbia, MD (US)

(73) Assignee: Alarm.com Incorporated, Tysons, VA (US)

( * ) Notice: Subject to any disclaimer, the term of this patent is extended or adjusted under 35 U.S.C. 154(b) by 4 days.

(21) Appl. No.: 16/442,995

(22) Filed: Jun. 17, 2019

Related U.S. Application Data

(60) Provisional application No. 62/686,177, filed on Jun. 18, 2018.

(51) Int. Cl.
*B60Q 9/00* (2006.01)
*G08G 1/01* (2006.01)

(52) U.S. Cl.
CPC .............. *B60Q 9/00* (2013.01); *G08G 1/0129* (2013.01)

(58) Field of Classification Search
CPC .......... B60Q 9/00; G08G 1/0129; G08G 1/04; G08G 1/0116; G08G 1/0175; G08G 1/012; G06K 9/00845; G06K 9/00335; G06K 9/00597; G06K 9/00832
USPC ..... 340/576, 933, 905, 425.5, 506; 382/103, 382/104, 107; 701/117
See application file for complete search history.

(56) References Cited

U.S. PATENT DOCUMENTS

| | | | | |
|---|---|---|---|---|
| 5,381,155 A | * | 1/1995 | Gerber | G08G 1/017 340/936 |
| 5,432,547 A | * | 7/1995 | Toyama | G08G 1/0175 340/937 |
| 5,809,161 A | * | 9/1998 | Auty | G01P 3/38 340/937 |
| 6,914,541 B1 | | 7/2005 | Zierden | |
| 6,970,102 B2 | | 11/2005 | Ciolli | |
| 7,791,503 B2 | * | 9/2010 | Breed | B60W 30/04 340/993 |
| 8,188,887 B2 | | 5/2012 | Catten et al. | |
| 8,189,048 B2 | | 5/2012 | Smith | |

(Continued)

FOREIGN PATENT DOCUMENTS

| | | |
|---|---|---|
| CA | 2434963 | 8/2002 |
| EP | 1301895 | 7/2008 |

*Primary Examiner* — Eric Blount
(74) *Attorney, Agent, or Firm* — Fish & Richardson P.C.

(57) ABSTRACT

Methods, systems, and apparatus, including computer programs encoded on a computer storage medium, for a distracted driver detection and alert system. In one aspect, a system includes a sensor that is located at the property and that is configured to generate sensor data that reflects an attribute of the property, and a monitor control unit that is configured to receive, from a traffic monitoring device, traffic monitoring data that reflects movement of a vehicle, classify, a driver of a vehicle as a distracted driver, determine that the vehicle is associated with the property and in response, determine, based on the sensor data and the traffic monitoring data, a likely identity of the driver, based on determining the likely identity of the driver, determine a classification of the driver, based on the classification of the driver, generate an alert, and provide, for output, the alert.

20 Claims, 5 Drawing Sheets

(56) References Cited

U.S. PATENT DOCUMENTS

| | | | |
|---|---|---|---|
| 9,349,291 B2 | 5/2016 | Goudy et al. | |
| 9,505,412 B2 | 11/2016 | Bai et al. | |
| 10,249,194 B2* | 4/2019 | Erickson | G08G 1/164 |
| 2014/0306833 A1* | 10/2014 | Ricci | H04W 36/0005 340/901 |
| 2014/0309789 A1* | 10/2014 | Ricci | G06F 3/017 700/276 |
| 2016/0073254 A1* | 3/2016 | Rosen | H04W 4/16 455/414.1 |
| 2016/0267335 A1 | 9/2016 | Hampiholi | |
| 2017/0301220 A1* | 10/2017 | Jarrell | F21S 8/088 |
| 2018/0012462 A1* | 1/2018 | Heitz, III | G08B 13/19669 |
| 2018/0342156 A1* | 11/2018 | Martin | G08G 1/0145 |

* cited by examiner

DISTRACTED DRIVER DETECTION AND ALERT SYSTEM

CROSS-REFERENCE TO RELATED APPLICATION

This application claims the benefit of U.S. Patent Application No. 62/686,177, filed on Jun. 18, 2018, which is incorporated herein by reference in its entirety.

TECHNICAL FIELD

This disclosure application relates generally to monitoring systems, and more particularly to detecting and providing alerts to distracted drivers.

BACKGROUND

A driver can be distracted while performing another activity that takes the driver's attention away from driving and can increase the chance of a motor vehicle crash. A driver can be distracted, for example, when the driver takes their eyes off the roadway, removes their hands from the steering wheel of the vehicle, or engages cognitively with an activity that is not driving related.

SUMMARY

Techniques are described for monitoring technology for distracted driver detection and alerts. Distracted driver detection systems can include various monitoring hardware devices installed at a roadway intersection for tracking vehicle activity through the intersection, where distracted drivers can be detected and reported to a user.

In general, one innovative aspect of the subject matter described in this specification can be embodied in a monitoring system that is configured to monitor a property, the monitoring system including a sensor that is located at the property and that is configured to generate sensor data that reflects an attribute of the property, and a monitor control unit that is configured to receive, from a traffic monitoring device, traffic monitoring data that reflects movement of a vehicle, classify, based on the traffic monitoring data, a driver of a vehicle as a distracted driver, determine, based on the traffic monitoring data, that the vehicle is associated with the property, in response to determining that the vehicle is associated with the property, determine, based on the sensor data and the traffic monitoring data, a likely identity of the driver, based on determining the likely identity of the driver, determine a classification of the driver, based on the classification of the driver, generate an alert, and provide, for output, the alert.

Other embodiments of this aspect include corresponding systems, apparatus, and computer programs, configured to perform the actions of the methods, encoded on computer storage devices.

These and other embodiments can each optionally include one or more of the following features. In some implementations, the monitor control unit is configured to receive historical traffic monitoring data samples that reflects previous movement of vehicles and that are each labeled as either being driven by a distracted driver or a non-distracted driver, and train, using machine learning, a vehicle/driver model using the historical traffic monitoring data samples. The monitor control unit can be configured to classify the driver of the vehicle as a distracted driver using the vehicle/driver model.

In some implementations, the monitor control unit is configured to receive historical traffic monitoring data samples that reflects previous movement of vehicles and that are each labeled as either being driven by a distracted driver or a non-distracted driver, and generate, using the historical traffic monitoring data samples, a vehicle/driver model that is configured to apply one or more rules to the traffic monitoring data to determine whether the driver is distracted.

In some implementations, the monitor control unit is configured to receive, from a user, data indicating that the driver is distracted or is not distracted, and updating, using machine learning, the vehicle/driver model based on the data indicating that the driver is distracted or is not distracted.

In some implementations, the monitor control unit is configured to determine a classification of the driver by determining that the driver is a driver associated with one or more driving restrictions, and generate an alert that includes the one or more driving restrictions associated with the driver. The alert can include one or more of an audio-type, haptic-type, or visual type alert.

In some implementations, the monitor control unit is configured to determine that the vehicle includes an onboard computer with which the monitor control unit is configured to communicate, and based on determining that the vehicle includes the onboard computer with which the monitor control unit is configured to communicate, provide, for output, the alert by providing, for output to the onboard computer, the alert.

In some implementations, the monitor control unit is configured to, determine that the vehicle does not include an onboard computer with which the monitor control unit is configured to communicate, and based on determining that the vehicle does not include the onboard computer with which the monitor control unit is configured to communicate, provide, for output, the alert by providing, for output to a computing device of an owner of the vehicle, the alert. The alert can include providing traffic monitoring data collected by the traffic monitoring devices, wherein traffic monitoring data comprises video data that captures movement of the vehicle of the distracted driver.

In some implementations, the monitor control unit is configured to, determine that the likely identity of the driver is not an owner of the vehicle, and based on determining that the likely identity of the driver is not the owner of the vehicle, provide, for output to a computing device of an owner of the, the alert.

In some implementations, traffic monitoring data includes video data capturing the vehicle within a scene of the video data. The sensor data can include driver location data that includes an association between a particular driver and a particular vehicle.

In some implementations, determining, based on the sensor data and the traffic monitoring data, a likely identity of the driver includes extracting, from video data of the vehicle, one or more vehicle identifiers, and determining, from the one or more vehicle identifiers for the vehicle and the driver location data, the likely identity of the driver of the vehicle.

In general, another innovative aspect of the subject matter described in this specification can be embodied in methods including receiving, by a monitoring system that is configured to monitor a property and from a traffic monitoring device, traffic monitoring data that reflects movement of a vehicle, receiving, by the monitoring system and from a sensor that is located at the property, sensor data that reflects an attribute of the property, classifying, based on the traffic monitoring data and by the monitoring system, a driver of a vehicle as a distracted driver, determining, based on the traffic monitoring data and by the monitoring system, that the vehicle is associated with the property, and in response to determining that the vehicle is associated with the property, determining, by the monitoring system and based on the sensor data and the traffic monitoring data, a likely identity of the driver, based on determining the likely identity of the driver, determining, by the monitoring system, a classification of the driver, based on the classification of the driver, generating, by the monitoring system, an alert, and providing, for output by the monitoring system, the alert.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

BRIEF DESCRIPTION OF THE DRAWINGS

Like reference numbers and designations in the various drawings indicate like elements.

DETAILED DESCRIPTION

Techniques are described for using a neural network and/or other analytics or rule-based software to collect monitoring data of vehicles and drivers as they are entering, exiting, or moving within a roadway intersection, detect distracted drivers, and provide alerts to drivers. The distracted driver of the vehicle can be identified using driver location and other vehicle information from a home monitoring system linked to the vehicle. For example, an alert can be provided to a driver of a vehicle (e.g., the owner of the vehicle) that is determined to have a distracted driver, where the distracted driver is identified based in part on data provided by a home monitoring system linked to the vehicle.

Figure 1:
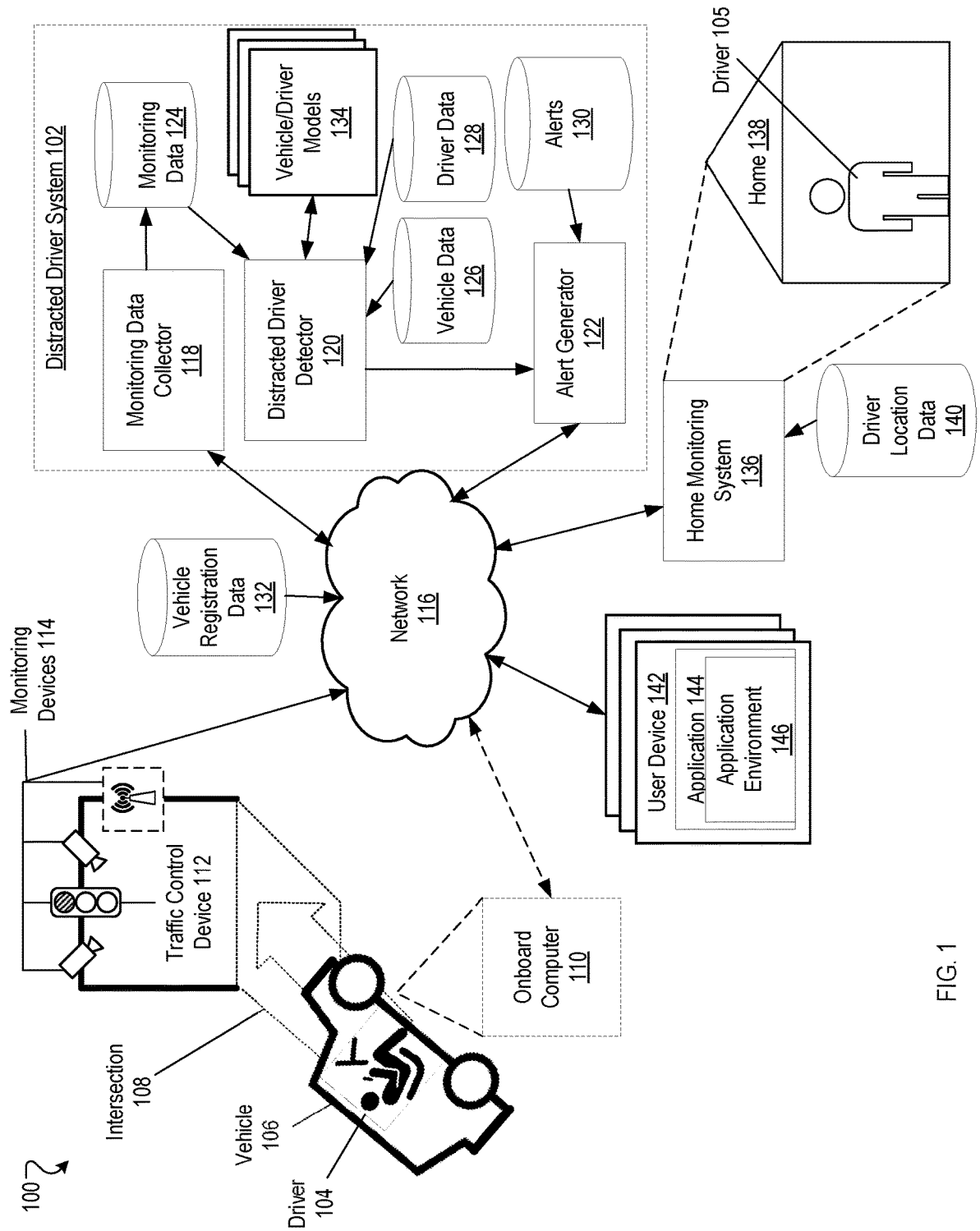
FIG. 1 is an example operating environment for a distracted driver detection system.

FIG. 1 is an example operating environment 100 for a distracted driver detection system 102. The distracted driver detection system 102 is configured to detect a distracted driver 104 of a vehicle 106. The distracted driver 104 of the vehicle 106 can be detected by the distracted driver detection system 102 while the vehicle 106 is in an intersection 108. A distracted driver 104 is a driver (e.g., operator of the vehicle 106) whose attention is focused away from the operation of the vehicle 106. A distracted driver 104 may be, for example, focused on a mobile phone, changing a radio station, looking around the interior/exterior of the vehicle 106, conversing with a passenger of the vehicle 106. A distracted driver 104 may exhibit one or more of the following characteristics: eye gaze looking away from the intersection 108, hand placement not on the steering wheel of the vehicle 106, overall posture, holding objects (e.g., holding a mobile phone, conversing with other occupants or on a mobile phone, traffic laws/patterns are not being observed, delay in reaction times, etc. Further details related to determining a distracted driver 104 are described below with reference to FIG. 2.

A vehicle 106 can be a commercial or non-commercial vehicle, for example, a car, a truck, a bus, a flatbed, a trailer truck, or another piece of heavy machinery (e.g., a forklift, tractor, and backhoe) that is operated on a roadway. For example, a vehicle 106 can be a car belonging to a driver 104. In another example, a vehicle 106 can be a car belonging to another driver (e.g., a parent of driver 104, an owner of a car in a vehicle-share program, etc.) In another example, a vehicle 106 can be a commercial trailer trucker (e.g., an 18-wheeler) operated by a commercial driver 104. Vehicle 106 can include an onboard computer 110 which can monitor and/or control various sensors (e.g., tire air pressure, engine temperature, throttle position, etc.), automatic transmission, anti-lock brakes, air bag deployment, keyless entry, climate control, motorized seats/mirrors, entertainment center (e.g., radio, MP3 player), cruise control, or the like.

An intersection 108 is an area of roadway that is defined by an overlap between two or more roadways meeting and/or crossing. The intersection 108 can include one or more of a traffic control devices 112 (e.g., stop light, stop sign, or other traffic control). The intersection 108 can be delineated by one or more traffic signs or demarcations (e.g., painted lines on the roadway). In one example, an intersection is a crossing between two streets including stoplights to regulate movement between cross-traffic vehicles. In another example, an intersection is a merging lane into a roadway including a yield for the merging lane into oncoming traffic.

In some implementations, the distracted driver detection system 102 can detect distracted drivers 104 in roadways such as highways, residential areas, parking lots, or other areas that are traversed by vehicles 106. For example, a distracted driver detection system 102 may be deployed in a high-traffic area of a parking lot. In another example, a distracted driver detection system 102 may be deployed along a stretch of a highway.

Intersection 108 includes one or more monitoring devices 114, for example, video cameras, Wi-Fi/Bluetooth receivers, IR motion detectors, pressure sensors, induction loops, radar, LIDAR, light curtain sensors or the like. In some implementations, video cameras can use particular modalities (e.g., infrared) or filters (e.g., polarized) to better distinguish a vehicle and/or its occupants. The one or more monitoring devices 114 can be positioned throughout the intersection 108 to monitor vehicle 106 motion in the intersection 108. In some implementations, the one or more monitoring devices 114 may track vehicle 106 entering/ exiting the intersection 108. For example, an array of video cameras each with a field of view overlapping with an area of the intersection 108 may track a vehicle 106 as it enters the intersection 108, while the vehicle 106 is within the area of the intersection 108, and as the vehicle 106 exits the intersection 108.

The one or more monitoring devices 114 (e.g., video cameras) may include image processing software to detect and identify vehicles in the intersection 108. In some implementations, the one or monitoring devices 114 may pre-process imaging data to determine that a vehicle has entered into the intersection 108 and push the imaging data that is indicative of a positively identified distracted driver 104 to the distracted driver detection system 102.

The one or more monitoring devices 114 are connected to the distracted driver system 102 through network 116. Network 116 can be configured to enable exchange of electronic communication between devices connected to the network 116. The network 116 can include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL), radio, television, cable, satellite, or any other delivery or tunneling mechanism for carrying data. Network 116 may include multiple networks or subnetworks, each of which may include, for example, a wired or wireless data pathway. Network 116 may include a circuit-switched network, a packet-switched data network, or any other network able to carry electronic communications (e.g., data or voice communications). For example, network 116 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. Network 116 may include one or more networks that include wireless data channels and wireless voice channels. Network 116 may be a wireless network, a broadband network, or a combination of networks includes a wireless network and a broadband network.

The distracted driver detection system 102 may be hosted on one or more local servers, a cloud-based service, or a combination of the two. The distracted driver detection system 102 includes a monitoring data collector 118, a distracted driver detector 120, and an alert generator 122. Additionally, the distracted driver detection system 102 includes one or more databases, for example, for storing monitoring data 124, vehicle data 126, driver data 128, and alert data 130. Although described herein as a monitoring data collector 118, a distracted driver detector 120, and an alert generator 122, the different functions of the distracted driver detection system 102 may be performed by more or fewer sub-systems within the distracted driver detection system 102.

The distracted driver detection system 102 can access a vehicle registration database 132 (e.g., from a government entity) through network 116. Vehicle registration data 132 can include vehicle identification numbers (VIN), tag data (e.g., license plates), title information (e.g., owner of the vehicle), drivers licenses, and the like. Vehicle registration data 132 may be accessible, for example, in a public database or through a partnership with a local law enforcement or government (e.g., city, county, state) authority. In some implementations, a portion or all of the vehicle registration data 132 can be stored locally at a same server hosting the distracted driver detection system 102. For example, the distracted driver detection system 102 may store vehicle registration data 132 for vehicles that are determined to be frequently present (e.g., regular commuters) in the intersection 108.

The distracted driver detection system 102 includes vehicle/driver models 134, which can be trained using machine learning and/or neural networks through unsupervised learning using monitoring data 124 collected by the monitoring data collector 118 from the monitoring devices 114 in the intersection 108. The monitoring data 124 can be historical traffic monitoring data for the intersection 108 where the traffic monitoring data 124 is collected over a period of time and used by the system 102 to train the vehicle/driver models 134.

In some implementations, historical traffic monitoring data that reflects previous movements of vehicles are labeled (e.g., autonomously, by human experts, or a combination thereof) as either being driven by a distracted driver or a non-distracted driver. The labeled data can be used to train, using machine learning, a vehicle/driver model 134.

In some implementations, the vehicle/driver model 134 can be a rule-based model, where one or more rules can specify if a driver is a distracted driver or an attentive driver. The set of rules for the vehicle/driver model 134 can include, for example, that a driver should have at least one hand on the steering wheel to be an attentive driver, or that a vehicle should begin moving responsive to a traffic signal within 10 seconds of the traffic signal indicating it is the vehicle's turn to proceed.

In some implementations, historical traffic monitoring data that reflects previous movements of vehicles are labeled (e.g., autonomously, by human experts, or a combination thereof) as either being driven by a distracted driver or a non-distracted driver. The labeled data can be used to train, using machine learning, a vehicle/driver model 134 that is configured to apply one or more rules to traffic monitoring data to determine whether a driver is distracted. Details of the training of the vehicle/driver models 134 is described in more detail below.

The distracted driver detection system 102 can communicate through the network 116 with a home monitoring system 136. The home monitoring system 136 collects data related to activity in home 138 including tracking drivers 104 entering/exiting the home 138 and vehicles 106 arriving/departing the home 138. Further details related to the home monitoring system 136 are discussed below with reference to FIG. 4.

The home monitoring system 136 tracks and stores data related to driver location 140. Driver location 140 can include information about one or more drivers 104 and 105 and vehicles 106 that are driven by the one or more drivers 104. The driver location 140 can include information about a location of a driver (e.g., the driver 105 is at home 138 or the driver 104 is not at home 138), and a particular driver 104 left the home 138 in a particular vehicle 106. For example, Driver A may be detected by the home monitoring system 136 leaving the home 138 inside Vehicle B, and the home monitoring system 136 stores this information in the driver location data 140. In another example, Driver C and Driver D may detected by the home monitoring system 136 leaving the home 138 inside Vehicle E, and the home monitoring system 136 stores this information in the driver location data 140.

One or more user devices 142 can communicate with the distracted driver detection system 102 and the home monitoring system 136 through the network 116. The one or more user devices 142 may include devices that host and display application 144 including an application environment 146. For example, a user device 142 is a mobile device that hosts one or more native applications (e.g., application 144) that includes an application interface 146 (e.g., a graphical-user interface (GUI)) through which a user of the user device 142 may interact with the distracted driver detection system 102 and/or the home monitoring system 136. The user device 142 may be a cellular phone or a non-cellular locally networked device with a display. The user device 142 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 142 may perform functions unrelated to the distracted driver detection system 102, such as placing personal telephone calls, playing music, playing video, displaying pictures, browsing the Internet, maintaining an electronic calendar, etc.

Distracted driver detection application 144 refers to a software/firmware program running on the corresponding mobile device that enables the user interface and features described throughout, and is a system through which the distracted driver detection system 102 may communicate with the driver 104. The user device 142 may load or install the distracted driver detection application 144 based on data received over a network or data received from local media. The distracted driver detection application 144 runs on mobile devices platforms, such as iPhone, iPod touch, Blackberry, Google Android, Windows Mobile, etc. The distracted driver detection application 144 enables the user device 142 to receive and process image and sensor data from the distracted driver detection system 102. The one or more user devices 142 may receive the data from the distracted driver detection system 102 through the network 116.

In some implementations, the distracted driver detection application 144 is a part of a home monitoring application for the home monitoring system 136. For example, a user (e.g., a driver 104 or driver 105) of a user device 142 may receive alerts from alert generator 122 through an application 144 that are related to distracted driver detection and notifications from the home monitoring system 136 that are related to home monitoring (e.g., home security).

In some implementations, the distracted driver detection application 144 is a part of a monitoring application for a monitoring system 136 for a business, a public facility (e.g., library, school, government building, public park), a private organization (e.g., a place of worship, a daycare), or another non-home type of location.

In some implementations, user device 142 may be a general-purpose computer (e.g., a desktop personal computer, a workstation, or a laptop computer) that is configured to communicate with the distracted driver detection system 102 over the network 116. The user device 142 may be configured to display an application interface 146 that is generated by the user device 142 or by the distracted driver detection system 102. For example, the user device 142 may be configured to display a user interface (e.g., a web page) provided by the distracted driver detection system 102 that enables a user to perceive images captured by the monitoring devices 114 (e.g., a camera) and/or reports related to the distracted driver detection system 102 (e.g., alerts generated by alert generator 122).

Figure 2:
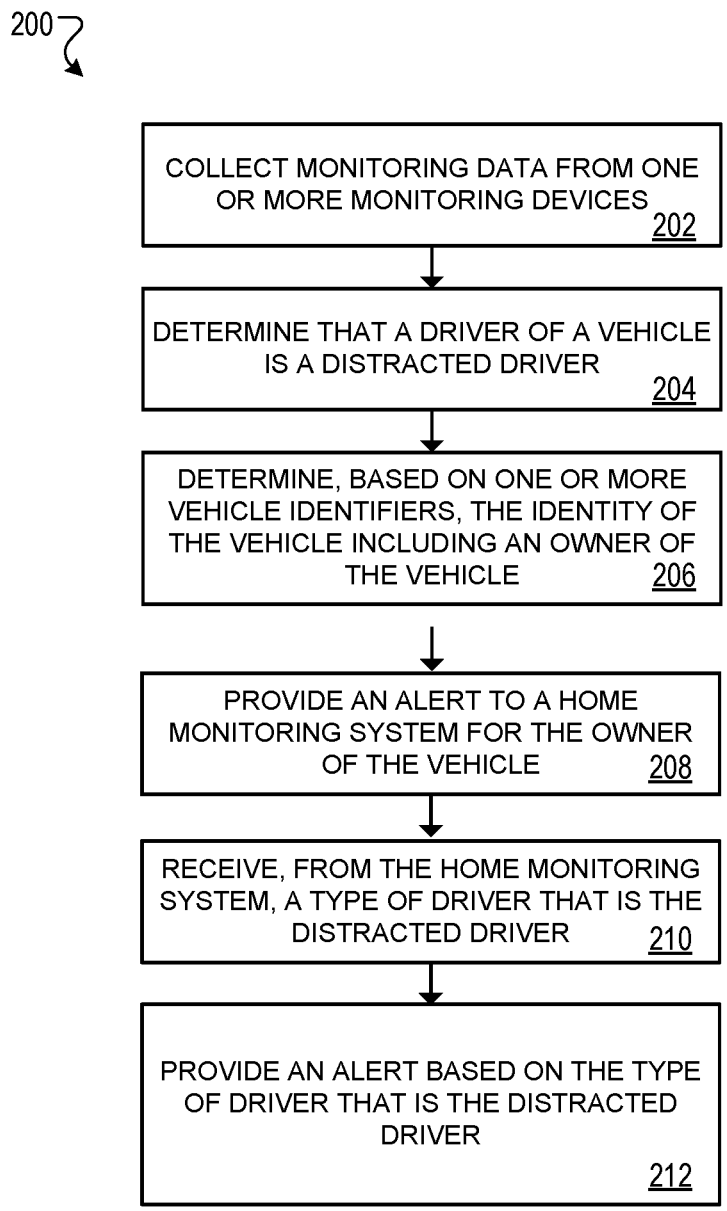
FIG. 2 is a process flow diagram of an example process of the distracted driver detection system.

FIG. 2 is a process flow diagram of an example process 200 of the distracted driver detection system 102. A monitoring system for a property can include one or more monitoring devices. For example, a home monitoring system 136 with a set of monitoring devices including one or more sensors (e.g., video cameras, license plate readers, motion detectors, and the like) can be utilized to monitor activity in and around a home 138. The monitoring system for a property can include a monitor control unit that is locally-based, cloud-based, or a combination thereof, to collect and analyze sensor data from the one or more sensors. For example, the monitor control unit can be a part of the home monitoring system 136. In some implementations, the monitor control unit can be configured to perform the actions described below.

Monitoring data 124 is collected from one or more monitoring devices 114 (202). The one or more traffic monitoring devices 114 (e.g., a surveillance camera) are deployed at a roadway (e.g., at an intersection 108) of interest to monitor traffic in the roadway from, for example, vehicles, pedestrians, cyclists, etc. The monitoring devices 114 can be continuously collecting data (e.g., image data) of the intersection, or may be triggered (e.g., by motion detection) to collect data when a vehicle 106 is determined to be in the vicinity (e.g., entering/exiting, moving within the area of the intersection) the intersection 108. Monitoring data 124 can include image/video data, Wi-Fi/Bluetooth data, global positioning system (GPS) data, cellular network usage data, and the like. The monitoring data 124 can be pushed from the one or more monitoring devices 114 to the distracted driver detection system 102 over the network 116, and/or can be collected by the monitoring data collector 118.

In some implementations, the monitoring devices 114 can locally pre-process the monitoring data 124. Pre-processing may include using image processing software and one or more locally stored calibration models 134 (e.g., vehicle/driver models) to detect a potential distracted driver 104 from the collected monitoring data 124 for the monitoring device 114 (e.g., image data collected by a surveillance camera) and upload the monitoring data 124 indicative of a potential distracted driver 104 to the distracted driver detection system 102.

The driver 104 of a vehicle 106 is determined to be a distracted driver (204). Image processing software and one or more classifiers can be used to process the traffic monitoring data and classify objects detected in the traffic monitoring data. Based on the traffic monitoring data, a driver of a vehicle can be identified as a distracted driver.

In some implementations, a driver 104 can be determined to be a distracted driver by detecting a vehicle in the collected monitoring data 124, In some implementations, a driver 104 of a vehicle 106 can be determined to be a distracted driver using machine-learning and/or neural networks. In one example, each frame of video monitoring data 124 is labeled (e.g., using semi-autonomous and/or expert-labeling) as containing a distracted driver or a non-distracted driver and a convoluted neural network (CNN) is trained from this labeled data set. The trained CNN can then label each new frame of video monitoring data 124 as "distracted" or "not distracted" and filter the results for further analysis. A driver can be labeled as "distracted" or "not distracted" based in part on a location of particular features of the driver relative to expected locations. For example, for each frame including a vehicle, a driver's side of the vehicle (e.g., depending on traffic laws for the country) can be identified and a position of a steering wheel determined. One or more locations of the driver's features (e.g., hands, face, shoulders, head, eyes, etc.) relative to expected positions (e.g., hands on steering wheel, eyes looking at the road, etc.) can be identified and heuristics can be applied (e.g., semi-autonomously and/or by expert labeling) to determine if the driver is "distracted" or "not distracted."

In some implementations, a recurrent neural network (RNN) or another deep neural network (DNN) that is structured to handle sequences of data is trained to process each frame in turn, such that the machine learning includes a temporal context, e.g., to monitor real-time the behavior of the distracted driver.

In some implementations, a location of individual features (e.g., face, eyes, hands, etc.) or overall pose of the body of the driver can be determined using an object detection neural network and/or a specialized pose estimation network (e.g., algorithms that can perform two-dimensional pose estimations). The results can be provided to a heuristic-based approach (e.g., "at least one hand must touch the wheel") and/or to a secondary neural network that has been trained on labeled training data.

In some implementations, the distracted driver detector 120 can process the monitoring data 124 using image processing software and one or more models 134 (e.g., vehicle/driver models) to detect if a driver 104 of a vehicle 106 is a distracted driver. The vehicle/driver models 134 can include a vehicle model for a vehicle 106 and a driver model for a driver 104. Training data can be generated from the traffic monitoring data collected from the traffic monitoring devices, where driver data and vehicle data can be extracted from the traffic monitoring data. A vehicle/driver model 134 can be trained using supervised learning with the training data (e.g., labeled image data of distracted drivers in vehicles and attentive drivers in vehicles). After the vehicle/driver model 134 is trained, it can be applied to a particular intersection 108 where unsupervised learning can be performed using monitoring data 124 collected from the monitoring devices 114 in the particular intersection 108.

The vehicle/driver model 134 can be a global model, a local model, or a combination thereof. A global vehicle/driver model 134 can describe a vehicle 106 and the vehicle's movement with respect to the intersection 108 (e.g., a coarse model). A global vehicle/driver model 134 can be used to track a vehicle (e.g., through respective fields of vision for each surveillance camera 114 monitoring the intersection 108) to determine how the vehicle 106 is moving (e.g., driving) through the intersection 108, for example, if the vehicle 106 is obeying traffic laws or if the vehicle 106 is moving irregularly with respect to traffic laws. In one example, a global vehicle/driver model 134 can describe one or more paths that a vehicle 106 can take through intersection 108 when the driver 104 of the vehicle 106 is attentive (e.g., a path that is followed where a vehicle stays in the correct traffic lane and has normal reaction times). In another example, a global vehicle/driver model 134 can describe one or more paths that a vehicle 106 can take through intersection 108 when the driver 104 of the vehicle 106 is distracted (e.g., swerving, cutting across lanes of traffic, wrong way flow of traffic, turning from/into an incorrect lane, backing-up on an exit ramp, etc.)

A local vehicle/driver model 134 can describe a driver 104 and the driver's movements with respect to the vehicle 106 (e.g., a fine model). A local vehicle/driver model 134 can be used to track a driver 104 and a driver's position and/or actions with respect to an interior of the vehicle 106 (e.g., using image data from one or more surveillance cameras 114 monitoring the intersection 108) in which the driver 104 is driving. For example, the local vehicle/driver model 134 can describe one or more positions and/or actions that a driver 104 can have with respect to the vehicle 106 when the driver 104 of the vehicle 106 is attentive (e.g., hands on the steering wheel, eye gaze on the intersection 108). In another example, the local vehicle/driver model 134 can describe one or more positions and/or actions that a driver 104 can have with respect to the vehicle 106 when the driver 104 of the vehicle 106 is distracted (e.g., looking down at a mobile phone, turned around to check back seat, hands off of the steering wheel, etc.)

In some implementations, the vehicle/driver model 134 is a rule-based model where one or more rules can be defined to characterize a distracted driver or an attentive driver. Rules can define driver characteristics, for example, driver hand position (e.g., "10 and 2"), driver eye gaze (e.g., on the road vs. looking at a mobile phone), or the like. Rules can define vehicle characteristics, for example, a threshold number of times that a vehicle can stray from a defined path (e.g., between traffic lanes), a safe distance between the vehicle 106 and a vehicle in front of it (e.g., is the vehicle tailgating). In one example, a rule can be "the driver has a mobile phone in hand" and a determined execution of the rule can result in the driver 104 being determined to be distracted.

In some implementations, a skeletal model can be formed of the vehicle 106 and/or driver 104 collected in the image data 124 from one or more monitoring devices 114 and can be utilized by the vehicle/driver model 134 to define what an attentive driver vs. what a distracted driver looks like when the driver 104 is operating a vehicle 106 in the intersection 108. In one example, a first trained convolutional neural network (CNN)/recurrent neural network (RNN) can be used to extract driver skeletal/body parameters from imaging data (e.g., head pose, hands, shoulders, and other key anatomical points at each image frame). A second trained CNN/RNN or a set of heuristics can receive the extracted driver skeletal/body parameters and determine likely activity of the driver and/or determine a distracted driving score. Hard heuristics and/or rules can be provided, for example, angles of a driver's head or hands contacting the steering wheel in particular positions (e.g., "10 and 2"). Using two CNN/RNN as described in this example can allow for adding and training new activities with smaller training sets. The extraction of skeletal/body parameters and/or the driver model 134 can be fine-tuned for particular individuals and applied to a generic activity detection model.

In some implementations, one or more monitoring devices 114 (e.g., video cameras, depth or RGB-D sensors) can be mounted on an interior of the vehicle 106 and can collect monitoring data (e.g., image data) of the driver 104 and vehicle 106. For example, a surveillance camera can be mounted on a dashboard of the vehicle 106 facing the driver's seat (e.g., a dashboard camera) and can collect image data of the driver 104 as the driver is in the driver's seat. The surveillance camera can collect image data, for example, that depicts the driver's hand position on the steering wheel, the driver's eye gaze (e.g., what the driver is looking at), objects in the driver's hands (e.g., a coffee mug, a mobile phone) and compare to models of drivers 104 that are determined to be attentive or distracted.

In some implementations, imaging data 124 collected from surveillance cameras 114 for a driver 104 in a vehicle 106 can be combined with data from an onboard computer 110 for the vehicle 106. For example, the onboard computer 110 can record average speeds, telemetry data such as braking times, power steering usage, and the like. The onboard computer 110 can provide the data recorded through network 116 to the distracted driver detection system 102 as monitoring data 124. The distracted driver detector 120 may analyze the provided data from the onboard computer 110 in combination with monitoring data 124 collected from monitoring devices 114 to determine if a driver 104 is a distracted driver.

The vehicle/driver models 134 can be specific to different categories of vehicles 106 (e.g., relative locations of a driver with respect to the vehicle based on a make/model of the vehicle). For example, an expected position of a driver 104 with respect to a car can be different from an expected position of a driver 104 with respect to a bus. The vehicle/driver models 134 can be specific to different categories of drivers 104 (e.g., an experienced driver may be an attentive driver with one hand on the steering wheel while a new driver may be required to have two hands on the steering wheel). Training of the vehicle/driver models 134 is described in more detail below with reference to FIG. 3.

In some implementations, a driver 104 of vehicle 106 may be scored based on a set of distracted driving metrics to determine if the driver 104 has exceeded a threshold of distraction. Distracted driving metrics can include, for example, eye gaze, hand positioning, delay in reaction times (e.g., moving after a stoplight turns green), lane violations (e.g., moving into cross-traffic), and the like. A threshold of distraction can be set for a particular intersection (e.g., busier intersections may have lower thresholds of distraction).

In some implementations, distracted driving metrics can be applied to drivers and vehicles on stretches of roadways (e.g., on a section of a highway) where cameras can be mounted on signs over/near the stretch of roadway. Distracted driving metrics can be used to monitor for irregular lane changing behavior (e.g., wandering across lanes) or aggressive driving behavior (e.g., tail-gating).

In some implementations, traffic patterns (e.g., stoplight patterns) for the intersection 108 can be provided to the distracted driver detection system 102. The distracted driver detection system 102 can use known traffic patterns to detect driver reaction times (e.g., a delay reacting to a light turning green) to traffic patterns to determine if a driver 104 is distracted. For example, a driver 104 who takes above a threshold amount of time (e.g., more than 5 seconds) to begin moving in the intersection 108 after a stoplight 112 turns green can be determined to be a distracted driver. In another example, a vehicle that is moving into an intersection when a respective stoplight 112 is red and the vehicle 106 should be stopped can be determined to be a distracted driver.

The identity of the vehicle 106 is determined based on one or more vehicle identifiers including an owner of the vehicle 106 (206). A vehicle 106 that is determined (e.g., by the distracted driver detector 120) to have a distracted driver can be identified, for example, by a license plate of the vehicle 106. A license plate reader (e.g., a surveillance camera including an OCR reader) can be used to detect and read tag information off a license plate of the vehicle 106. Vehicle registration data 132 including ownership information for the vehicle 106 can be accessed by the distracted driver detection system 102. For example, the distracted driver detection system 102 can determine that a vehicle 106 intersection 108 has a distracted driver 104 and that the vehicle 106 has a license plate tag "ABC1234."

The distracted driver detection system 102 can access vehicle registration data 132 and determine that vehicle 106 with tag "ABC1234" is associated with (e.g., is owned by, is insured to be driven by, is registered to) to a driver 104 "Jane Smith." A vehicle 106 can be associated with multiple different drivers 104, for example, a family of three drivers each can be a driver of the vehicle 106. In another example, a vehicle 106 can be part of a ride-share/car-share program and can have multiple different authorized drivers 104.

In some implementations, the distracted driver detection system 102 can include tracking a vehicle using RFID, cellular, or other wireless tracking that the distracted driver detection system 102 can use to identify (or verify as a secondary identification method) the vehicle. For example, a vehicle can include an RFID chip inside the vehicle that can be read by an RFID reader in an intersection 108, where the RFID chip is a unique identifier for the vehicle 106.

The vehicle registration data 132 can include one or more forms of contact information (e.g., telephone number, home address, electronic mail address) for a driver 104 that is associated with the vehicle 106. For example, the vehicle registration data 132 can be a contact phone number for "Jane Smith." In another example, the vehicle registration data 132 can be registration information for the vehicle for a monitoring service (e.g., a driving monitoring service and/or a home monitoring service) where the vehicle 106 has been registered (e.g., by an owner of the vehicle) through a website or mobile phone application including, for example, one or more photos of the vehicle or license plate.

In some implementations, the vehicle registration data 132 can include a vehicle identifier associating the vehicle 106 with a property (e.g., home 138 with home monitoring system 136), for example, establishing a mutual ownership between an owner of the vehicle 106 and an owner of a home 138 having home monitoring system 136. An owner of home 138 can identify vehicle 106 in the home monitoring system 136 as a vehicle to track in the distracted driver detection system 102 (e.g., a parent registers their teenager's car with the distracted driver detection system 102 and links alerts for the car to their home monitoring system 136).

In response to determining that the vehicle 106 is associated with the property (e.g., home 138 and home monitoring system 136), the distracted driver detection system determines, based on the sensor data from monitoring system and the traffic monitoring data, a likely identity of the driver. In some implementations, determining a likely identity of the driver includes querying the monitoring system for details related to drivers and vehicles associated with the property.

An alert is provided to a home monitoring system 136 for the owner of the vehicle 106 (208). The alert generator 122 can provide one or more alerts/notifications 130 to the home monitoring system 136 including information about the vehicle 106 and the detected distracted driver 104. The alert can be processed by the home monitoring system 136 to determine an identity of the driver 104 that is determined to be a distracted driver.

In some implementations, the identity of the driver 104 can be determined by the home monitoring system 136 using sensor data tracking the movements of one or more drivers 104 and 105 in the home 138. Further details related to the operating environment of the home monitoring system 136 are discussed with reference to FIG. 4.

The home monitoring system 136 can determine, based on the driver location data 140 and the vehicle registration data 132 provided by the distracted driver detection system 102 for the vehicle 106 determined to have the distracted driver, a likely identity of the distracted driver. Driver location data 140 can be stored by the home monitoring system 136 including a current location of each driver 104 that is tracked by the home monitoring system 136. The home monitoring system 136 can track drivers 104 and 105 as they exit/enter the home 138, and further determine a vehicle 106 that the driver 104 has entered/exited. For example, home monitoring system 136 can determine that a tag identification number of the vehicle 106 provided by the distracted driver detection system 102, and that has been identified by the distracted driver detection system 102 as having a distracted driver, corresponds to a vehicle tracked by the home monitoring system 136 as "Jane's green Honda Accord." The home monitoring system 136 can access driver location data 140 and determine that driver "Jane Smith" has left home 138 in "Jane's green Honda Accord."

A type of driver that is the distracted driver is received from the home monitoring system 136 (210). The type of driver can be a classification of the driver, where a driver can be classified by, for example, a level of experience (e.g., driver with less than 2 years of experience, driver with greater than 5 years of experience, etc.), an age range (e.g., less than 21 years old, between 21-34 years old, greater than 65 years old, etc.), a class of license held by the driver (e.g., commercial license, class "C" license, motorcycle license), or a restriction on a license (e.g., no driving after dark, no passengers allowed in vehicle with driver, etc.). A driver may be classified into one or more categories or types of driver. For example, a driver can be a teenage driver and classified as holding a restricted license (e.g., no passengers, no driving after dark), and as an inexperienced driver having less than 2 years of driving experience. In another example, a driver can be a commercial truck driver and be classified as having a commercial license and being between 21-34 years old.

In some implementations, the home monitoring system 136 can provide to the distracted driver detection system 102 additional information for the driver 104 that is determined to be the distracted driver. The additional information for the driver 104 can be provided to the home monitoring system 136 by a user (e.g., homeowner) of the home monitoring system 136. For example, the home monitoring system 136 can provide information to the distracted driver detection system 102 related to a type of driver that is the distracted driver. A type of driver can include an inexperienced driver (e.g., a teenager or new driver), a vehicle owner, a renter/sharer of the vehicle (e.g., through a ride-share or car-share arrangement), an employee or contractor, or the like. Continuing the example provided above, "Jane Smith" can be identified by the home monitoring system 136 as the owner of "Jane's green Honda Accord," where a user of the home monitoring system 136 has previously identified the connection between "Jane Smith" and "Jane's green Honda Accord." In another example, a distracted driver "Tommy Smith" can be identified by the home monitoring system 136 as the distracted driver of "Jane's green Honda Accord" and as a teenage driver.

In some implementations, a home monitoring system 136 can provide additional information for a teenage or otherwise inexperienced driver related to restrictions on their driving. For example, a teenage driver may be restricted to driving during daylight hours (e.g., subject to a curfew), or may not be allowed to have passengers. The home monitoring system 136 may provide the additional restrictions to the distracted driver detection system 102 as feedback which the distracted driver detection system 102 may use to further determine if the driver 104 is in violation of the additional restrictions. The distracted driver detection system 102 can provide alerts based on the additional restrictions (e.g., determines that the distracted driver 104 is driving with passengers when it is not allowed), for example, alerting the teenager's parents that they are violating a "no passengers" rule.

In some implementations, a home monitoring system 136 for each driver of a ride-share/car share arrangement can provide information for a vehicle 106 where the driver is determined to be distracted. For example, authorized drivers "John Williams" and "Ben Jones" can be authorized drivers of "Jane's green Honda Accord" (e.g., Jane Smith has allowed them to borrow her car formally or informally). Jane Smith can designate in home monitoring system 136 that there are other authorized drivers of "Jane's green Honda Accord" (e.g., through one or more rules). The home monitoring system 136 can receive the alert 130 and provide location information for a respective driver (e.g., based on facial recognition of surveillance image data of a driver entering Jane's green Honda Accord in the driveway of the home). For example, a distracted driver "John Williams" can be identified by the home monitoring system 136 for John William's home as the distracted driver of "Jane's green Honda Accord" and as a participant in a "car-share" program with owner Jane Smith.

Based on the type of driver that is the distracted driver 104, an alert 130 is provided (212). A particular class of drivers can have pre-associated alerts, for example, a distracted driver that is classified as an inexperienced driver can be pre-associated with an alert to a parent of the inexperienced driver. In another example, a distracted driver that is classified as a commercial driver can be pre-associated with an alert to a business owner or manager of the commercial driver.

An alert 130 can be a text message or SMS to a mobile phone, an alert to an onboard computer 110 to a driver 104 (e.g., through the speakers of the vehicle, a haptic alert to a seat or steering wheel, a pop-up message displayed on a dashboard or windshield of the vehicle), flashing lights (e.g., inside the vehicle or outside in the intersection), an automatic phone call between the driver's mobile phone and another user (e.g., a parent of the driver), a pop-up message to application 142, or the like. For example, an alert 130 can be a haptic feedback on the steering wheel of the vehicle 106 determined to have a distracted driver that can be controlled by an on-board computer 110. In another example, an alert 130 can be a phone call initiated (e.g., through the vehicle's Bluetooth speakers) between the distracted driver and another user (e.g., between a teenager and their parent, between an employee and their employer).

The alert 130 can be provided to one or more other drivers 105 who are not the distracted driver 104. A driver 105 who receives an alert 130 can be an owner of the vehicle 106, a parent of the distracted driver 104, an employer of the distracted driver 104, emergency services (e.g., police), an insurance provider for the distracted driver 104, or the like. The type of driver that is the distracted driver 104 can determine the one or more other drivers 105 who receive an alert 130. For example, if the distracted driver 104 is determined to be an inexperienced driver (e.g., a teenager), the alert 130 can be a phone call through the Bluetooth speakers of the call between the teenager and the teenager's parent. In another example, if the distracted driver 104 is determined to be an employee driving a commercial vehicle, a first alert 130 can be an SMS message to the employee's phone and a second alert can be a pop-up notification on application 144 at an employer's user device 142. Further details of commercial use are described below with reference to FIG. 5.

In some implementations, the home monitoring system 136 provides the alert 130 to one of more users to notify the one or more other drivers 105 about the distracted driver 104. For example, a driver 105 of the home monitoring system 136 can select to receive alerts about distracted drivers 104 from the home monitoring system 136 (e.g., through application 144).

In some implementations, the distracted driver detection system 102 provides the alert 130 to the one or more other drivers 105 to notify the one or more other drivers 105 about the distracted driver 104. The distracted driver detection system 102 can received information from the home monitoring system 136 including contact information for one or more users designated to receive the alert 130 about the distracted driver 104, and provide the alert 130 to the one or more drivers 105.

In some implementations, the alert 130 can include providing monitoring data (e.g., image data) 124 collected by monitoring devices 114 in the intersection 108 of the distracted driver 104 and vehicle 106 for review to the one or more drivers 105. For example, a video clip showing a distracted driver 104 can be provided in an alert 130 presented in an application environment 146 on the user device 142 to driver 105. In another example, a hyperlink can be provided in an SMS message send to a driver 105 which, when selected, can direct the driver 105 to a website to review the monitoring data 124 that is determined to be representative of the distracted driver 104.

In some implementations, the distracted driver detection system 102 can track instances of distracted driving for a driver 104 over a period of time (e.g., a month, a year, etc.) and generate a distracted driving report of the driver's 104 level of distraction including, for example, a distracted driving score (e.g., a measure of how frequently a driver is determined to be distracted). The distracted driving report can be provided to the driver 104, one or more other drivers 105 (e.g., a parent or employer of driver 104), to an insurance provider, etc. The distracted driving report can include information identifying causes for the distracted driving (e.g., checking a mobile phone) and make suggestions for improvement.

Figure 3:
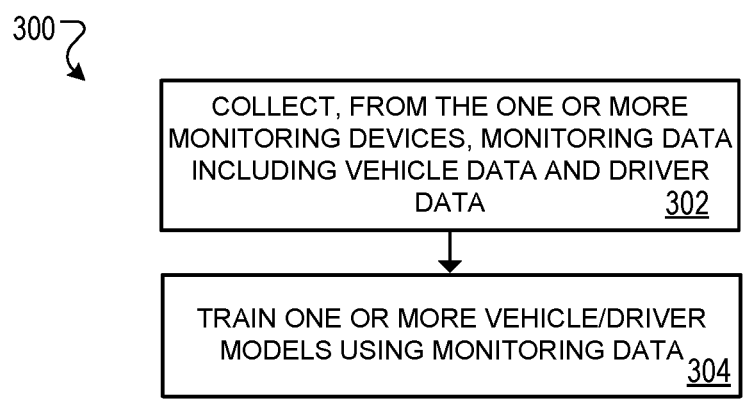
FIG. 3 is a process flow diagram of another example process of the distracted driver detection system.

In some implementations, site-specific vehicle/driver models 134 (e.g., specific to the intersection 108) can be trained. FIG. 3 is a process flow diagram of another example process 300 of the distracted driver detection system 102. Generic vehicle/driver models 134 can be trained using supervised learning and sets of data (e.g., image data) that have been identified (e.g., human-assigned labels) as indicative of distracted drivers and attentive drivers. For example, vehicle data 126 and driver data 128 indicative of distracted drivers (e.g., how a distracted driver appears in image data) can be used to train generic vehicle/driver models 134. After an initial supervised training period, the vehicle/driver models 134 can be applied at a particular intersection 108. Monitoring data 214 is collected (e.g., using monitoring data collector 118) from one or more monitoring devices 114 in the intersection 108 of vehicles 106 and drivers 104 (302). The vehicle/driver model 134 can be used to detect (e.g., by the distracted driver detector 120) a distracted driver 104, for example, in imaging data 124 provided by a surveillance camera 114 in intersection 108.

In some implementations, a site-specific vehicle/driver model 134 for a particular intersection 108 can incorporate factors such as glare from the sun, particular angles of the roadways that form the intersection 108 (e.g., non-orthogonal roadways forming the intersection), types of vehicles that frequent the intersection (e.g., more commercial traffic vs. more residential traffic), typical traffic patterns (e.g., how traffic tends to progress through the intersection), typical traffic violations (e.g., an intersection may have frequent red light violations, aggressive driving, inefficient lane use).

In some implementations, the site-specific vehicle model 134 for a particular intersection 108 can be used to detect issues within the intersection 108. For example, if a threshold number of vehicles 106 in the intersection 108 are determined to be deviating from the site-specific model 134 (e.g., swerving or deviating from a normal path of travel), a problem can be determined with the roadway (e.g., a pothole, debris) or with a particular vehicle(s) in the roadway (e.g., an accident, a stalled vehicle).

One or more vehicle/driver models 134 are trained using monitoring data 124 (304). A generated alert 130 to a user device 142 can include, for example, imaging data 124 depicting the detected distracted driver. A user of the user device 142 can review the provided imaging data 124 and affirm a positive detection of a distracted driver, or provide negative feedback (e.g., a false positive). The vehicle/driver models 134 can be further refined and customized to be site-specific using user feedback (e.g., using natural language processing) responsive to alerts 130 about distracted drivers.

In some implementations, site-specific vehicle/driver models 134 for particular vehicles 106 and drivers 104 can be trained such that a particular driver model 134 can be applied for a driver who is frequently recognized in the intersection 108 (e.g., a regular commuter). A site-specific vehicle/driver model 134 can be used to more effectively identify distraction in the driver (e.g., by recognizing posture, habits) by understanding a degree to which various actions represent distraction for the driver 104. For example, a particular driver may drive a manual transmission car and therefore have only one hand on the steering wheel of the car (e.g., other hand on the clutch). A site specific vehicle/driver model 134 for the driver 104 can be trained to recognize this habit as not distracted. In another example, a different driver 104 may regularly be driving with one hand on the wheel and another hand holding a mobile phone. The site-specific vehicle/driver model 134 for the different driver can be trained to recognize this habit as distracted. User feedback responsive to alerts sent notifying about a distracted driver can be used to further refine the site-specific vehicle/driver model 134.

In some implementations, training a vehicle/driver model 134 includes one or more heuristics that can be applied to the monitoring data, for example, head pose/body pose, telemetry, hand position (e.g., whether a driver is touching a steering wheel of the vehicle 106), gaze target (e.g., whether the driver is looking out a front windshield of the vehicle 106), presence of objects in the hand (e.g., holding a mobile phone, a coffee cup), presence of other passengers, facial expression and activity, actual motion of the vehicle (e.g., where the car is driving relative to the roadway) or the like. Neural networks can be trained to output one or more heuristics that can be applied to the monitoring data.

In some implementations, training a vehicle/driver model 134 includes using neural networks to classify distracted driving and not-distracted driving using expert labeling (e.g., by a human user) of these behaviors, where the vehicle/driver model 134 is trained using supervised learning.

In some implementations, data can be received from a user indicating that the driver is distracted or is not distracted (e.g., using natural language feedback). The vehicle/driver model 134 can be updated using machine learning based on the data received from the user.

Figure 4:
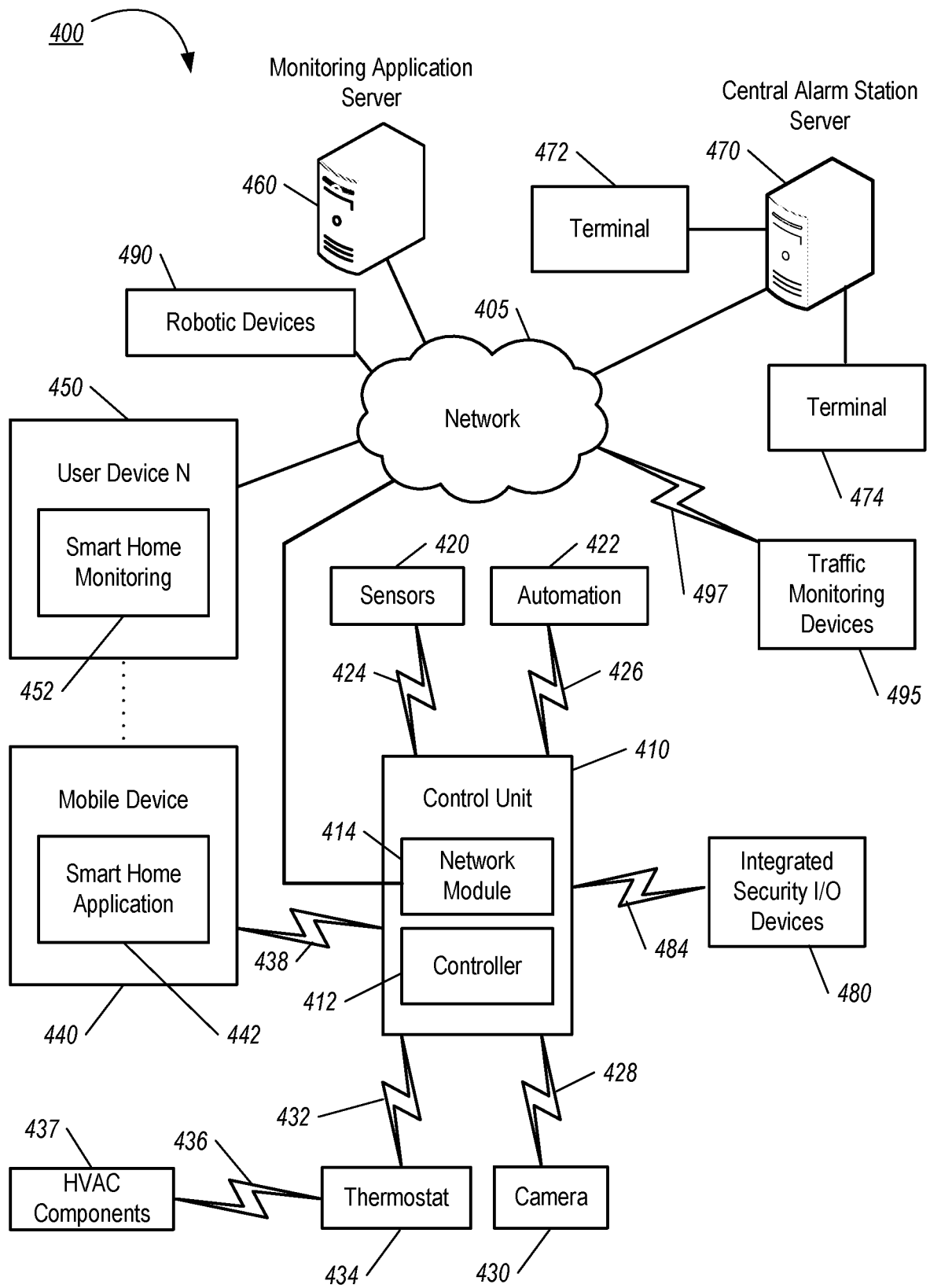
FIG. 4 shows a diagram illustrating an example home monitoring system.

FIG. 4 is a diagram illustrating an example of a home monitoring system 400. The electronic system 400 includes a network 405, a control unit 410, one or more user devices 440 and 450, a monitoring server 460, and a central alarm station server 470. In some examples, the network 405 facilitates communications between the control unit 410, the one or more user devices 440 and 450, the monitoring server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 420 can also include a radio-frequency identification (RFID) sensor that identifies a particular article that includes a pre-assigned RFID tag.

The control unit 410 communicates with the home automation controls 422 and a camera 430 to perform monitoring. The home automation controls 422 are connected to one or more devices that enable automation of actions in the home. For instance, the home automation controls 422 may be connected to one or more lighting systems and may be configured to control operation of the one or more lighting systems. In addition, the home automation controls 422 may be connected to one or more electronic locks at the home and may be configured to control operation of the one or more electronic locks (e.g., control Z-Wave locks using wireless communications in the Z-Wave protocol). Further, the home automation controls 422 may be connected to one or more appliances at the home and may be configured to control operation of the one or more appliances. The home automation controls 422 may include multiple modules that are each specific to the type of device being controlled in an automated manner. The home automation controls 422 may control the one or more devices based on commands received from the control unit 410. For instance, the home automation controls 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building or home monitored by the control unit 410. The camera 430 may be configured to capture single, static images of the area and also video images of the area in which multiple images of the area are captured at a relatively high frequency (e.g., thirty images per second). The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the home automation controls 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the control unit 410. The camera 430 may employ a small solar cell to recharge the battery when light is available. Alternatively, the camera 430 may be powered by the controller's 412 power supply if the camera 430 is co-located with the controller 412.

In some implementations, the camera 430 communicates directly with the monitoring server 460 over the Internet. In these implementations, image data captured by the camera 430 does not pass through the control unit 410 and the camera 430 receives commands related to operation from the monitoring server 460.

The system 400 also includes thermostat 434 to perform dynamic environmental control at the home. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a home and/or environmental data at a home, e.g., at various locations indoors and outdoors at the home. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more home automation controls 422.

A module 437 is connected to one or more components of an HVAC system associated with a home, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices 490. The robotic devices 490 may be any type of robots that are capable of moving and taking actions that assist in home monitoring. For example, the robotic devices 490 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 490 may be devices that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a home. In these examples, the robotic devices 490 include sensors and control processors that guide movement of the robotic devices 490 within the home. For instance, the robotic devices 490 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the home and guide movement of the robotic devices 490 in a manner that avoids the walls and other obstacles.

In addition, the robotic devices 490 may store data that describes attributes of the home. For instance, the robotic devices 490 may store a floorplan and/or a three-dimensional model of the home that enables the robotic devices 490 to navigate the home. During initial configuration, the robotic devices 490 may receive the data describing attributes of the home, determine a frame of reference to the data (e.g., a home or reference location in the home), and navigate the home based on the frame of reference and the data describing attributes of the home. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the home. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the home. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid-state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the home. The robotic devices 490 may be configured to navigate to the charging stations after completion of tasks needed to be performed for the monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the home may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the home that is not associated with a charger. The number of community charging stations may be less than the number of robotic devices 490.

In addition, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive one or more sensor data from the sensors 420 and determine whether to provide an alert to the one or more integrated security input/output devices 480.

The system 400 further includes one or more traffic monitoring devices 495 (e.g., monitoring devices 114) in communication with the network 405 (e.g., network 116) through communication link 497. The one or more traffic monitoring devices 495 can include any type of device used to monitor traffic patterns along a particular roadway (e.g., an intersection 108, a stretch of highway, a traffic circle). For example, traffic monitoring devices 495 can be traffic cameras, Wi-Fi/Bluetooth receivers, pressure sensors, motion detectors, induction loops, etc. The one or more traffic monitoring devices 495 can collect data (e.g., imaging data) that can be used by system 400 to detect distracted drivers.

In some implementations, a distracted driver detection system (e.g., distracted driver detection system 102) can be implemented on monitoring server application 460, as a part of the home monitoring system (e.g., home monitoring system 136). In some implementations, the distracted driver detection system can be implemented on a separate server from the monitoring application server 460.

The sensors 420, the home automation controls 422, the camera 430, the thermostat 434, and the integrated security devices 480 may communicate with the controller 412 over communication links 424, 426, 428, 432, 438, and 484. The communication links 424, 426, 428, 432, 438, and 484 may be a wired or wireless data pathway configured to transmit signals from the sensors 420, the home automation controls 422, the camera 430, the thermostat 434, and the integrated security devices 480 to the controller 412. The sensors 420, the home automation controls 422, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 438, and 484 may include a local network. The sensors 420, the home automation controls 422, the camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 460 is an electronic device configured to provide monitoring services by exchanging electronic communications with the control unit 410, the one or more user devices 440 and 450, and the central alarm station server 470 over the network 405. For example, the monitoring server 460 may be configured to monitor events (e.g., alarm events) generated by the control unit 410. In this example, the monitoring server 460 may exchange electronic communications with the network module 414 included in the control unit 410 to receive information regarding events (e.g., alerts) detected by the control unit 410. The monitoring server 460 also may receive information regarding events (e.g., alerts) from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor and image data received from the monitoring system and perform analysis of sensor and image data received from the monitoring system. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, image, and other data to determine an activity pattern of a resident of the home monitored by the system 400. In some implementations, the monitoring server 460 may analyze the data for alarm conditions or may determine and perform actions at the home by issuing commands to one or more of the controls 422, possibly through the control unit 410.

The monitoring server 460 can be configured to provide information (e.g., activity patterns) related to one or more residents of the home monitored by the system 400 (e.g., driver 104). For example, one or more of the sensors 420, the home automation controls 422, the camera 430, the thermostat 434, and the integrated security devices 480 can collect data related to a resident including location information (e.g., if the resident is home or is not home) and provide location information to the distracted driver detection system for the resident.

The central alarm station server 470 is an electronic device configured to provide alarm monitoring service by exchanging communications with the control unit 410, the one or more mobile devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more mobile devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the home monitoring application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a home monitoring application 442. The home monitoring application 442 refers to a software/firmware program running on the corresponding mobile device that enables the user interface and features described throughout. The user device 440 may load or install the home monitoring application 442 based on data received over a network or data received from local media. The home monitoring application 442 runs on mobile devices platforms, such as iPhone, iPod touch, Blackberry, Google Android, Windows Mobile, etc. The home monitoring application 442 enables the user device 440 to receive and process image and sensor data from the monitoring system.

The user device 450 may be a general-purpose computer (e.g., a desktop personal computer, a workstation, or a laptop computer) that is configured to communicate with the monitoring server 460 and/or the control unit 410 over the network 405. The user device 450 may be configured to display a smart home user interface 452 that is generated by the user device 450 or generated by the monitoring server 460. For example, the user device 450 may be configured to display a user interface (e.g., a web page) provided by the monitoring server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the home automation controls 422, the camera 430, and the robotic devices 490. The one or more user devices 440 and 450 receive data directly from the sensors 420, the home automation controls 422, the camera 430, and the robotic devices 490, and sends data directly to the sensors 420, the home automation controls 422, the camera 430, and the robotic devices 490. The one or more user devices 440, 450 provide the appropriate interfaces/processing to provide visual surveillance and reporting.

In other implementations, the system 400 further includes network 405 and the sensors 420, the home automation controls 422, the camera 430, the thermostat 434, and the robotic devices 490, and are configured to communicate sensor and image data to the one or more user devices 440 and 450 over network 405 (e.g., the Internet, cellular network, etc.). In yet another implementation, the sensors 420, the home automation controls 422, the camera 430, the thermostat 434, and the robotic devices 490 (or a component, such as a bridge/router) are intelligent enough to change the communication pathway from a direct local pathway when the one or more user devices 440 and 450 are in close physical proximity to the sensors 420, the home automation controls 422, the camera 430, the thermostat 434, and the robotic devices 490 to a pathway over network 405 when the one or more user devices 440 and 450 are farther from the sensors 420, the home automation controls 422, the camera 430, the thermostat 434, and the robotic devices 490.

In some examples, the system leverages GPS information from the one or more user devices 440 and 450 to determine whether the one or more user devices 440 and 450 are close enough to the sensors 420, the home automation controls 422, the camera 430, the thermostat 434, and the robotic devices 490 to use the direct local pathway or whether the one or more user devices 440 and 450 are far enough from the sensors 420, the home automation controls 422, the camera 430, the thermostat 434, and the robotic devices 490 that the pathway over network 405 is required.

In other examples, the system leverages status communications (e.g., pinging) between the one or more user devices 440 and 450 and the sensors 420, the home automation controls 422, the camera 430, the thermostat 434, and the robotic devices 490 to determine whether communication using the direct local pathway is possible. If communication using the direct local pathway is possible, the one or more user devices 440 and 450 communicate with the sensors 420, the home automation controls 422, the camera 430, the thermostat 434, and the robotic devices 490 using the direct local pathway. If communication using the direct local pathway is not possible, the one or more user devices 440 and 450 communicate with the sensors 420, the home automation controls 422, the camera 430, the thermostat 434, and the robotic devices 490 using the pathway over network 405.

In some implementations, the system 400 provides end users with access to images captured by the camera 430 to aid in decision making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "away" state, but set not to capture images when the alarm system is armed in a "home" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

In some embodiments, the distracted driver detection system 102 can be utilized by a business or other commercial enterprise to monitor and track drivers and vehicles associated with the business. A business can include a fleet of associated vehicles (e.g., service trucks, delivery trucks, etc.) that a business owner may want to monitor and track. For example, the distracted driver detection system 102 can be utilized by a business that hires drivers, for example, delivery drivers, taxis or on-demand ride service drivers, service employees, (e.g., lawn care, house cleaners, repairs, or business to business service providers), or a small business' sales employees that tend to be on the road.

Figure 5:
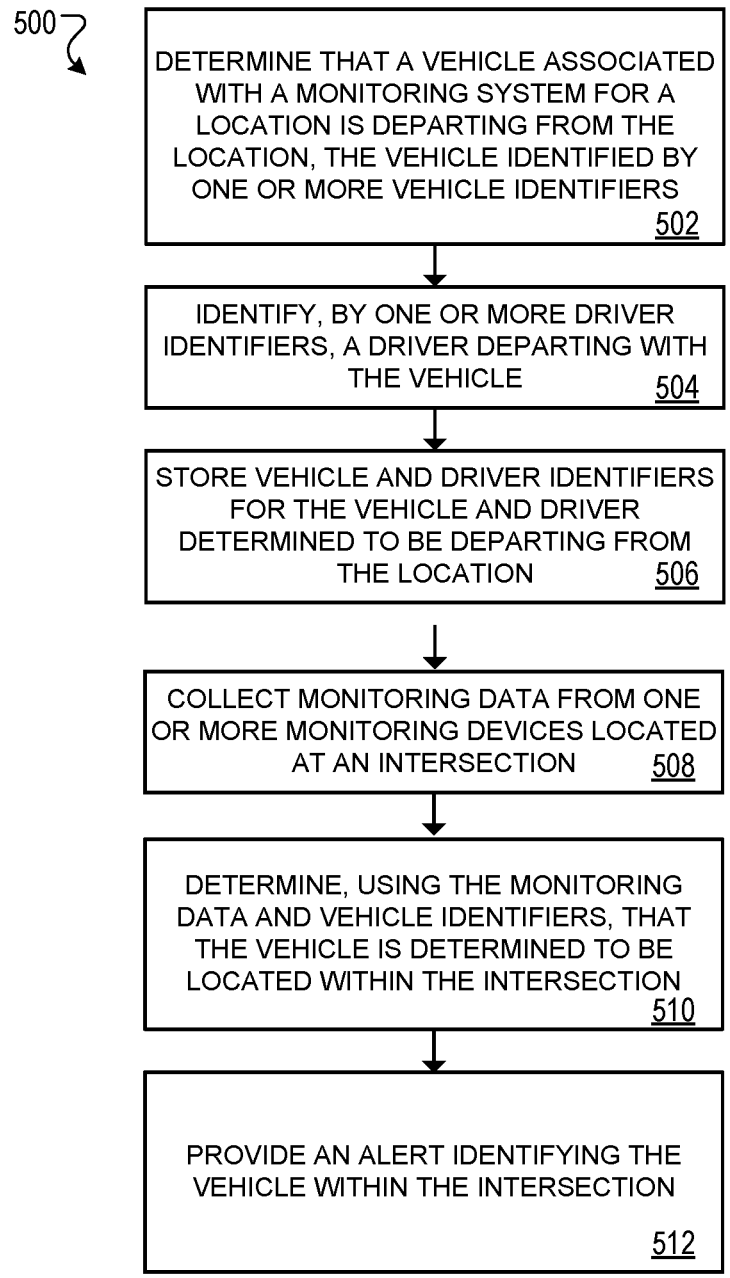
FIG. 5 is a process flow diagram of another example process of the distracted driver detection system.

FIG. 5 is a process flow diagram of another example process 500 of the distracted driver detection system. A vehicle associated with a monitoring system for a location is determined to depart from the location, the vehicle identified by one or more vehicle identifiers (502). In one example, a vehicle is a delivery truck for a package delivery service. A location of the package delivery service (e.g., a storefront location) includes a monitoring system with a set of monitoring devices, e.g., video cameras, RFID tags, license plate readers, barcorde scanners, etc. Each delivery truck of the multiple delivery trucks can be identified, for example, by a license plate number, an RFID tag in a window of the truck, or other physical markings on the truck that distinguish a particular delivery truck from each other truck in the fleet.

In some implementations, vehicles can be identified by a relative location within lot, parking space numbers, a visible ID number on the vehicle, computer readable code (e.g., bar code, 3D matrix code, QR code) on the vehicle.

A driver is identified to be departing with the vehicle, the driver identified by one or more driver identifiers (504). A driver can be, for example, an employee of the business. Continuing the example above, the driver can be a delivery person. The particular employee can be identified as departing with the delivery truck by one or more of the monitoring devices in the monitoring system. For example, the driver can be identified in imaging data collected by surveillance cameras. In another example, the driver might digitally sign-out a truck (e.g., through a mobile application). In yet another example, a device associated with the driver (e.g., a mobile device or tablet) can be detected disconnecting from a Wi-Fi network associated with the business as the driver is leaving the premises in the vehicle.

In some implementations, tracking which vehicle an employee enters can be accomplished by person-recognition combined with vehicle identification in imaging data collected by the one or more monitoring devices associated with the business.

Vehicle and driver identifiers are stored for the vehicle and driver determined to be departing from the location (506). In one example, vehicle data 126 and driver data 128 are stored including real-time associations between the vehicle and driver, e.g., which driver is currently in which vehicle. Other identifying information about the vehicles and drivers, e.g., license plate numbers, vehicle year/make/model, mileage, driver's license number and restrictions, etc., can be updated to reflect a current state of the vehicle and driver pairing. Time-stamps of departures and estimated route/destination(s) can be stored for the vehicle and driver.

Monitoring data from one or more monitoring devices located at an intersection is collected (508). As described above with reference to FIG. 2, monitoring data 124 can include imaging data from one or more video cameras located at the intersection 108. In some implementations, a delivery vehicle is known to be traveling along a particular route and monitoring data can be collected at particular intersections as the vehicle is expected to be arriving within the intersection.

In some implementations, monitoring data can be collected from multiple intersections to track the movement of a vehicle across multiple intersections. Cross-intersection detections can help determine approximately how long a driver employee of a vehicle is stopped at a destination by tracking how long the vehicle is "off-grid." Time between each detection time at particular intersections can be tracked. For example, a "last detection timestamp" can be recorded, and a threshold interval of "no detection" of the vehicle, e.g., 86 minutes, can be interpreted as the driver is stopped somewhere. A business owner can then correlate this information to the employee's logged stop locations and times.

Using the monitoring data and the vehicle identifiers, the vehicle is determined to be located within the intersection (510). While the vehicle is on the road and being monitored a similar distracted driver system can be used as already described with reference to FIGS. 1-3 above, with the addition of further individual vehicle identification via a code or visible ID (e.g., the code can be painted on the roof of the vehicle) to be easily detected by overhead cameras.

In some implementations, as described above with reference to FIG. 2, one or more vehicle/driver models 134 can be used to identify a particular vehicle and driver in the intersection from the monitoring data. The vehicle and/or driver identifiers can be used by the monitoring system to identify the particular vehicle and driver that are determined to be located in the intersection.

An alert is provided identifying the vehicle within the intersection (512). In some implementations, an alert is provided to an owner of the business, e.g., if the driver is determined to be a distracted driver as described above with reference to FIGS. 1-3. The alert can additionally be provided to a mapping or tracking application software, to determine if the employee is taking the most direct route to the assigned destination (e.g., with no personal side trips), how long the driver is taking at each stop, if the driver is making the appropriate stops (e.g., rather than not getting out and marking a package "undeliverable,"), etc. This tracking can be performed regardless if the employee has disabled or is out-of-range of location tracking services (e.g., global positioning services (GPS)), adding an additional layer of tracking and monitoring that be performed for a business. Imagery of the driver can be linked to a doorbell camera video to verify a delivery and provide access to an authorized delivery service.

In some implementations, time intervals between detections from one intersection to the next intersection can be recorded and reported to a business (e.g., via a tracking application) to detect potential speeding based on known distance and speed limits between two different intersections.

In some embodiments, the distracted driver detection system 102 can be utilized by a school (e.g., a high school, college campus, etc.) which can have a higher concentration of inexperienced drivers driving in a school-affiliated parking lot or nearby the school location. The distracted driver detection system 102 can be used to detect distracted student drivers and provide alerts (e.g., to the parents of the student drivers) as described above.

In some embodiments, the distracted driver detection system 102 may operate without requiring data and feedback from a home (or business) monitoring system. Vehicle identifiers (e.g., license plates, title/tag/registration information) can be accessed, for example, using government records (e.g., state department of transportation) or insurance records, and used to identify a likely driver of the vehicle (e.g., the driver insured to drive the vehicle and/or the driver listed as the owner of the vehicle in government records). In some implementations, the distracted driver detection system 102 may operate to monitor a particular intersection 108 and report distracted drivers, with or without a likely driver identity, to law enforcement or other governmental and/or private businesses. For example, a law enforcement professional may utilize a distracted driver detection system 102 to track locations (e.g., intersections) where a high density of distracted drivers are occurring, in order to more efficiently deploy police officers.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A monitoring system that is configured to monitor a property, the monitoring system comprising:
  a sensor that is located at the property and that is configured to generate sensor data that reflects an attribute of the property; and
  a monitor control unit that is configured to:
    receive, from a traffic monitoring device, traffic monitoring data that reflects movement of a vehicle;
    classify, based on the traffic monitoring data, a driver of a vehicle as a distracted driver;
    determine, based on the traffic monitoring data, that the vehicle is associated with the property;
    in response to determining that the vehicle is associated with the property, determine, based on the sensor data and the traffic monitoring data, a likely identity of the driver;
    based on determining the likely identity of the driver, determine a classification of the driver;

based on the classification of the driver, generate an alert; and provide, for output, the alert.

2. The system of claim 1, wherein the monitor control unit is configured to:

receive historical traffic monitoring data samples that reflects previous movement of vehicles and that are each labeled as either being driven by a distracted driver or a non-distracted driver; and train, using machine learning, a vehicle/driver model using the historical traffic monitoring data samples.

3. The system of claim 2, wherein the monitor control unit is configured to classify the driver of the vehicle as a distracted driver using the vehicle/driver model.

4. The system of claim 2, wherein the monitor control unit is configured to:

receive historical traffic monitoring data samples that reflects previous movement of vehicles and that are each labeled as either being driven by a distracted driver or a non-distracted driver; and generate, using the historical traffic monitoring data samples, a vehicle/driver model that is configured to apply one or more rules to the traffic monitoring data to determine whether the driver is distracted.

5. The system of claim 2, wherein the monitor control unit is configured to:

receive, from a user, data indicating that the driver is distracted or is not distracted; and updating, using machine learning, the vehicle/driver model based on the data indicating that the driver is distracted or is not distracted.

6. The system of claim 1, wherein the monitor control unit is configured to:

determine a classification of the driver by determining that the driver is a driver associated with one or more driving restrictions; and generate an alert that includes the one or more driving restrictions associated with the driver.

7. The system of claim 1, wherein the alert comprises one or more of an audio-type, haptic-type, or visual type alert.

8. The system of claim 1, wherein the monitor control unit is configured to:

determine that the vehicle includes an onboard computer with which the monitor control unit is configured to communicate; and based on determining that the vehicle includes the onboard computer with which the monitor control unit is configured to communicate, provide, for output, the alert by providing, for output to the onboard computer, the alert.

9. The system of claim 1, wherein the monitor control unit is configured to:

determine that the vehicle does not include an onboard computer with which the monitor control unit is configured to communicate; and based on determining that the vehicle does not include the onboard computer with which the monitor control unit is configured to communicate, provide, for output, the alert by providing, for output to a computing device of an owner of the vehicle, the alert.

10. The system of claim 9, wherein the alert comprises providing traffic monitoring data collected by the traffic monitoring devices, wherein traffic monitoring data comprises video data that captures movement of the vehicle of the distracted driver.

11. The system of claim 1, wherein the monitor control unit is configured to:

determine that the likely identity of the driver is not an owner of the vehicle; and based on determining that the likely identity of the driver is not the owner of the vehicle, provide, for output to a computing device of an owner of the, the alert.

12. The system of claim 1, wherein traffic monitoring data comprises video data capturing the vehicle within a scene of the video data.

13. The system of claim 12, wherein the sensor data comprises driver location data that includes an association between a particular driver and a particular vehicle.

14. The system of claim 13, wherein determining, based on the sensor data and the traffic monitoring data, a likely identity of the driver comprises:

extracting, from video data of the vehicle, one or more vehicle identifiers; and determining, from the one or more vehicle identifiers for the vehicle and the driver location data, the likely identity of the driver of the vehicle.

15. A computer-implemented method comprising:

receiving, by a monitoring system that is configured to monitor a property and from a traffic monitoring device, traffic monitoring data that reflects movement of a vehicle;

receiving, by the monitoring system and from a sensor that is located at the property, sensor data that reflects an attribute of the property;

classifying, based on the traffic monitoring data and by the monitoring system, a driver of a vehicle as a distracted driver;

determining, based on the traffic monitoring data and by the monitoring system, that the vehicle is associated with the property;

in response to determining that the vehicle is associated with the property, determining, by the monitoring system and based on the sensor data and the traffic monitoring data, a likely identity of the driver;

based on determining the likely identity of the driver, determining, by the monitoring system, a classification of the driver;

based on the classification of the driver, generating, by the monitoring system, an alert; and providing, for output by the monitoring system, the alert.

16. The method of claim 15, comprising:

receiving, by the monitoring system, historical traffic monitoring data samples that reflect previous movement of vehicles and that are each labeled as either being driven by a distracted driver or a non-distracted driver; and training, by the monitoring system and using machine learning, a vehicle/driver model using the historical traffic monitoring data samples.

17. The method of claim 16, comprising:

classifying, by the monitoring system, the driver of the vehicle as a distracted driver using the vehicle/driver model.

18. The method of claim 16, comprising:

receiving, by the monitoring system, historical traffic monitoring data samples that reflect previous movement of vehicles and that are each labeled as either being driven by a distracted driver or a non-distracted driver; and generating, by the monitoring system and using the historical traffic monitoring data samples, a vehicle/driver model that is configured to apply one or more rules to the traffic monitoring data to determine whether the driver is distracted.

19. The method of claim 16, comprising:
receiving, by the monitoring system and from a user, data indicating that the driver is distracted or is not distracted; and
updating, by the monitoring system and using machine learning, the vehicle/driver model based on the data indicating that the driver is distracted or is not distracted.

20. A computer storage medium encoded with a computer program, the program comprising instructions that when executed by data processing apparatus cause the data processing apparatus to perform operations comprising:
receiving, by a monitoring system that is configured to monitor a property and from a traffic monitoring device, traffic monitoring data that reflects movement of a vehicle;
receiving, by the monitoring system and from a sensor that is located at the property, sensor data that reflects an attribute of the property;
classifying, based on the traffic monitoring data and by the monitoring system, a driver of a vehicle as a distracted driver;
determining, based on the traffic monitoring data and by the monitoring system, that the vehicle is associated with the property;
in response to determining that the vehicle is associated with the property, determining, by the monitoring system and based on the sensor data and the traffic monitoring data, a likely identity of the driver;
based on determining the likely identity of the driver, determining, by the monitoring system, a classification of the driver;
based on the classification of the driver, generating, by the monitoring system, an alert; and
providing, for output by the monitoring system, the alert.

* * * * *